United States Patent [19]

Olarig

[11] Patent Number: 6,057,863
[45] Date of Patent: May 2, 2000

[54] DUAL PURPOSE APPARATUS, METHOD AND SYSTEM FOR ACCELERATED GRAPHICS PORT AND FIBRE CHANNEL ARBITRATED LOOP INTERFACES

[75] Inventor: Sompong P. Olarig, Cypress, Tex.

[73] Assignee: Compaq Computer Corporation, Houston, Tex.

[21] Appl. No.: 08/961,895

[22] Filed: Oct. 31, 1997

[51] Int. Cl.[7] .................................................... G06F 13/14
[52] U.S. Cl. ........................ 345/520; 345/501; 345/507; 395/309; 395/859; 395/892
[58] Field of Search ................................... 345/501–503, 345/519–521, 508, 511; 395/651–653, 200.47, 200.83, 280, 284, 292, 309, 310, 311, 821, 828, 830, 842, 859, 872, 892, 894

[56] References Cited

U.S. PATENT DOCUMENTS

| | | | |
|---|---|---|---|
| 5,450,570 | 9/1995 | Richek et al. | 395/500 |
| 5,479,627 | 12/1995 | Khalidr et al. | 711/205 |
| 5,664,161 | 9/1997 | Fukushima et al. | 345/501 |
| 5,694,615 | 12/1997 | Thapar et al. | 395/822 |
| 5,737,524 | 4/1998 | Cohen et al. | 395/281 |
| 5,740,381 | 4/1998 | Yen | 710/113 |
| 5,802,568 | 9/1998 | Csoppenszky | 711/136 |
| 5,809,328 | 9/1998 | Nogales et al. | 395/825 |
| 5,809,329 | 9/1998 | Lichtman et al. | 395/828 |
| 5,812,789 | 9/1998 | Diaz et al. | 395/200.77 |
| 5,835,962 | 11/1998 | Chang et al. | 711/206 |

OTHER PUBLICATIONS

Halfhill, "Unclogging the PC Bottlenecks", *Byte* Sep. 1997, vol. 22, No. 9.
Yong, "AGP Speeds 3D Graphics" *Microprocessor Report*, Jun. 17, 1996.
Brummer, "PCI–to–AGP Move Boosts 3–D Graphics" *Electronic Engineering Times*, 1997, N952, p. 84.
Accelerated Graphics Port Interface Specification, Revision 1.0, Intel Corporation, Jul. 31, 1996.

*Primary Examiner*—U. Chauhan
*Attorney, Agent, or Firm*—Paul N. Katz; Frohwitter

[57] ABSTRACT

A multiple use core logic chipset is provided in a computer system that may be configured either as a bridge between an accelerated graphics port ("AGP") bus and host and memory buses, or as an interface bridge between a Fibre Channel Arbitrated Loop ("FC-AL") interface and the host and memory buses. The function of the multiple use chipset is determined at the time of manufacture of the computer system or in the field whether an AGP bus bridge or an FC-AL bridge interface is to be implemented. Selection of the type of bus bridge (AGP or FC-AL bridge interface) in the multiple use core logic chipset may be made by a hardware signal input, or by software during computer system configuration or power on self test ("POST"). Software configuration may also be determined upon detection of either an AGP or a FC-AL bridge interface device connected to the common AGP/ FC-AL bus. FC-AL information may be stored in the computer system main memory using the high speed FC-AL bridge interface.

27 Claims, 9 Drawing Sheets

DUAL PURPOSE APPARATUS, METHOD AND SYSTEM FOR ACCELERATED GRAPHICS PORT AND FIBRE CHANNEL ARBITRATED LOOP INTERFACES

CROSS REFERENCE TO RELATED PATENT APPLICATION

This patent application is related to commonly owned U.S. patent applications Ser. No. 08/853,289; filed May 9, 1997; now U.S. Pat. No. 5,889,970; entitled "Dual Purpose Apparatus, Method And System For Accelerated Graphics Port And Peripheral Component Interconnect" by Ronald T. Horan and Sompong P. Olarig; and Ser. No. 08/885,062; filed Jun. 30, 1997; entitled "Apparatus, Method And System For Dual Accelerated Graphics Ports" by Ronald T. Horan, Gary W. Thome and Sompong P. Olarig; both applications hereby incorporated by reference.

BACKGROUND OF THE INVENTION

1. Field of the Invention

The present invention relates to computer systems using core logic circuits as a bus bridge(s) to interface a central processor(s), video graphics processor, memory and input-output peripherals together, and more particularly, in utilizing the same core logic circuits as a bus bridge for an accelerated graphics port(s) and/or a Fibre Channel Arbitrated Loop interface(s).

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0, PCI System Design Guide, revision 1.0; and PCI BIOS Specification, revision 2.1, the disclosures of which are hereby incorporated by reference. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Digital Equipment Corporation, Cyrix, IBM and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference. This AGP specification is available from Intel Corporation, Santa Clara, Calif.

The AGP interface specification uses the 66 MHz PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates in excess of 500 megabytes per second ("MB/sec.") using the AGP 2x mode. The remaining AGP specification does not modify the PC 2.1 Specification, but rather provides a range of graphics-oriented performance enhancements for use by the 3-D graphics hardware and software designers. The AGP specification is neither meant to replace nor diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having a Fibre Channel Arbitrated Loop (FC-AL) interface, more fully described hereinbelow, for connecting to input-output devices such as high performance and storage capacity multiple disk drives, high-bandwidth networking, and the like. The FC-AL has the ability to address up to 126 devices and store up to 1.1 Terabytes of data per loop, with data transfer rates reaching 200 Megabytes per second (MB/sec) using dual loops and having cabling distances from 30 meters to 10 kilometers.

AGP and PCI devices serve different purposes and the respective interface cards (e.g., AGP 3-D video controller and PCI NIC) are not physically interchangeable even though there is some commonality of signal functions between the AGP and PCI interface specifications. While AGP capabilities are very desirable in a personal computer utilizing 3-D graphics, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance of any personal computer product must be maximized while constantly reducing its manufacturing costs. To achieve a high performance to cost ratio, commonality of components and high volume of use are key factors. Thus, commonality of components such as logic circuits, printed circuit boards, microprocessors, computer boxes and power supplies, will drive the costs down for both workstations and servers. Also the high end workstations and network servers would benefit if one generic model of a personal computer could be effectively used in either capacity. Further benefits in reducing costs may be realized by using common components in portable and desktop (consumer and low end business) computers.

Faster and more sophisticated microprocessors are here now or will soon be introduce in the near future. The Digital Equipment Corporation "ALPHA" processor runs in excess of 400 MHz and the still in development, Intel Corporation's 64 bit data and address bus width processors (code name Merced) will soon be available for use in high end computer servers. As processor speeds continue to increase, and practical multi-processor hardware and operating system software is multiplying this ever increasing data processing power. I/O speeds and memory storage capacity must match the processor performance or the processors will be starved of data.

Fibre Channel has been proposed as a solution for high speed data transfer and has been widely accepted in the computer industry. Fibre Channel is a 1 gigabit per second (or faster) data transfer interface technology that provides a general transport vehicle for Upper Level Protocols (ULPs) such as Intelligent Peripheral Interface (IPI) and Small Computer System Interface (SCSI) command sets, the High-Performance Parallel Interface (HIPPI) data framing, Internet Protocol (IP), IEEE 802.2, Asynchronous Transfer Mode (ATM), and the like. The Fibre Channel technology merges high-speed I/O and networking functionality into one connectivity technology. Fibre Channel is an integrated set of standards established by the American National Standards Institute (ANSI) X3T11 for both network and channel I/O interfaces, and these ANSI Fibre Channel Standards are hereby incorporated by reference. The Fibre Channel Standards (FCS) include, but are not limited to: FC-PH, FC-PH-2, physical and signaling interfaces; FC-FG, FC-SW, FC-GS, fabric requirements and generic services; FC-AL, arbitrated loop topology; FC-IG, implementation guidance; FC-SB, FC-FP, FC013 Disk, FC-13 Tape, FC-LE, SCSI-FCP, SCSI-GPP and FC-ATM are FC-4 documents; FC-AE, commercial and military avionics applications.

The FCS define high-speed data transfer interfaces that can be used to connect together workstations, mainframes, supercomputers, storage devices and displays. These standards address the need for very fast transfers of large volumes of information and may relieve system manufacturers from the burden of supporting the variety of channels and networks currently in place, as it provides unified standards for networking, storage and data transfer. The Fibre Channel standards are organized into the following levels:

FC-0 defines the physical portions of the Fibre Channel including the fibre, connectors, and optical and electrical parameters for a variety of data rates and physical media. Coax and twisted pair versions are defined for limited distance applications. FC-0 provides the point-to-point physical portion of the Fibre Channel. A variety of physical media is supported to address variations in cable plants.

FC-1 defines the transmission protocol which includes the serial encoding, decoding, and error control.

FC-2 defines the signaling protocol which includes the frame structure and byte sequences.

FC-3 defines a set of services which are common across multiple ports of a node.

FC-4 is the highest level in the Fibre Channel standards set. It defines the mapping, between the lower levels of the Fibre Channel and the IPI and SCSI command sets, the HIPPI data framing, IP, and other Upper Level Protocols (ULPs).

Of these levels, FC-0, FC-1, and FC-2 are integrated into the FC-PH document. The Fibre Channel protocol provides a range of implementation possibilities extending from minimum cost to maximum performance. The transmission medium is isolated from the control protocol so that each implementation may use a technology best suited to the environment of use. These standards are more fully defined in ANSI X3.230-1994, Fibre Channel Physical and Signaling Interface (FC-PH) Rev 4.3, available from the American National Standards Institute, 11 W. $42^{nd}$ Street, New York, N.Y. 10036, and are hereby incorporated by reference.

What is needed is an apparatus, method, and system for a personal computer that provides at least one AGP interface connected to at least one AGP bus and a Fibre Channel Arbitrated Loop (FC-AL) interface, or two or more FC-AL interfaces utilizing multiple use high production volume logic and interface circuits having the capability of providing an FC-AL and/or an AGP interface(s).

SUMMARY OF THE INVENTION

The present invention provides in a computer system a multiple use core logic chipset that may be configured as a bridge between an AGP bus(es) and host and memory buses, and/or as an interface between the host and memory buses and an FC-AL interface(s). The function of the multiple use chipset may be determined at the time of manufacture of the computer system or may be changed in the field to an AGP bus bridge or an FC-AL interface for an FC-AL logic module which in turn connects to an FC-AL physical link interface. The core logic chipset has provisions for both the AGP and FC-AL interface signals and is adapted for connection to the AGP bus(es) and/or the FC-AL logic. Selection of which configuration (AGP and/or FC-AL interface) the core logic of the present invention is to assume may be determined by the type of computer system printed circuit motherboard utilized with the core logic chipset or by software configuration during computer system startup, configuration, or power-on self test (POST). The core logic chipset of the present invention has arbiters which have Request ("REQ") and Grant ("GNT") signal lines for the AGP device(s) and each PCI device on a primary PCI bus. The FC-AL interface(s) may have a 32 bit wide control register interface and a 64 bit wide direct memory access (DMA) interface for connection to the FC-AL logic. The FC-AL logic converts the parallel control and data information to and from the FC-AL interface in the core logic to the high speed full duplex serial data streams used with the FC-AL physical link module. The FC-AL physical link module converts the outgoing high speed serial information into light pulses with a laser or light emitting diode (LED), or translates the information to electrical signals compatible with copper coaxial cable or twisted pairs. Incoming FC-AL signals are received either by a laser or LED light detector, or by an electrical line receiver such as an emitter coupled logic (ECL) line receiver. The FC-AL physical link module may be used, for example, to connect the computer system into a Storage Area Networking ("SAN"). SAN is an emerging data communications environment which interconnects servers and storage devices at Gigabaud speeds.

The embodiments of the invention contemplate a multiple use core logic chipset which may be one or more integrated circuit devices such as an Application Specific Integrated Circuit ("ASIC"), Programmable Logic Array ("PLA") and the like. An AGP device may be embedded on the computer system motherboard, or may be on a separate card which plugs into a corresponding AGP card edge connector attached to the system motherboard and connected to the multiple use core logic chipset. The FC-AL logic and FC-AL physical link module may also be embedded on the computer system motherboard or may be a plug in device(s) for ease of configuration or upgrade. The FC-AL physical link module may have full duplex transmit and receive capabilities, and have a transmitter and receiver for optical laser, LED, copper coaxial cable, or twisted pair cable depending on the FC-AL loop distance desired.

The multiple use core logic chipset of the present invention may be used in conjunction with a specific use printed circuit motherboard for a workstation, personal computer, portable computer, or a network server. In an embodiment of the present invention, the type of motherboard used may be adapted to apply hardware signal inputs to the core logic chipset for determining the configuration (AGP or FC-AL interface) thereof. The multiple use core logic chipset may also be configured to provide either the AGP or FC-AL interface by software selection and is within the scope of the present invention. In addition, the core logic chipset that may be used in a personal computer system for dual loop FC-AL interfaces when an AGP bus is not needed by utilizing multiple use high production volume logic and interface circuits having the capability of providing a combination of two AGP or two FC-AL interfaces, or a combination of one AGP and FC-AL interface. External connections of the core logic package may be used for either an AGP bus interface or an FC-AL interface by using signal switches inside of the package to connect the external connections of the core logic package to the appropriate signal interface circuits within the package.

An advantage of the present invention is being able to use the same multiple use core logic chipset across different types of computer products. This increases the quantity of these chipsets being manufactured, thus resulting in a corresponding decrease in the cost per chipset.

Another embodiment of the present invention provides for two AGP bus interfaces, one AGP bus interface and one FC-AL interface, or two FC-AL interfaces. Also contemplated and within the scope of the present invention is the core logic chipset being configurable as a PCI bus interface, as more fully disclosed in commonly owned U.S. patent applications Ser. No. 08/853,289; filed May 9, 1997, entitled "Dual Purpose Apparatus, Method And System For Accelerated Graphics Port And Peripheral Component Interconnect" by Ronald T. Horan and Sompong P. Olarig; and Ser. No. 08/885,062; filed Jun. 30, 1997; entitled "Apparatus, Method And System For Dual Accelerated Graphics Ports " by Ronald T. Horan, Gary W. Thome and Sompong P. Olarig; both applications incorporated by reference hereinabove.

As disclosed above, the multiple use core logic chipset may have signal inputs for configuring whether it functions as an AGP interface or an FC-AL interface, however, it is also contemplated in the present invention that the multiple use chipset may be software programmed to select either the AGP or the FC-AL interface function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program which performs the discovery process may be referred to as the PCI bus enumerator. Both AGP and PCI device enumeration is done via PCI bus transactions.

An advantage of the present invention is that software may determine at POST whether the AGP, the FC-AL interface, or a combination of both are to be supported by the core logic chipset. This feature makes the core logic chipset of the present invention compatible with any computer system used as a workstation, personal computer, portable, or network server by utilizing the appropriate system motherboard having provisions for either or both AGP and FC-AL interfaces.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention is an apparatus, method and system for providing in a computer system a multiple use core logic chipset capable of implementing either a bridge between the host and memory buses and an AGP bus(es), and/or a bridge between the host and memory buses and an FC-AL interface (s). The multiple use core logic chipset of the present invention may be configured by hardware input signals or by software programming thereof.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having a Fibre Channel Arbitrated Loop (FC-AL) interface for example an FC-AL implemented storage area network (SAN) having both local and remote servers and storage interconnected together. Computers used as network servers require merely simple two dimensional ("2-D") graphics, thus the AGP bus is an overkill for this type of computer, and having an FC-AL interface would greatly benefit the network server if it did not materially increase the cost thereof.

The AGP interface specification is a derivation or superset of the PCI interface specification and thus shares many common signal functions. Furthermore, the AGP bridge connects to the processor host bus and system memory bus through the computer system core logic chipset, thus it would be desirable to use the chipset logic and driver circuits of the AGP bridge also as an interface for FC-AL logic and a FC-AL physical link module. This enhances the versatility of the core logic chipset and reduces the overall cost of computer systems, both workstation and network servers, by having a common multiple use core logic chipset that could be manufactured in large volumes so as to increase the flexibility of computer configurations utilizing the core logic of the present invention.

The AGP logic enables a high speed interface between the computer system main memory and an AGP device. When an AGP interface is not required in the computer system, or only one of two AGP interfaces are required, much of the common logic circuits in the core logic chipset may be utilized for a high speed interface between the main memory and the FC-AL interface. This also enables utilization of main memory for storage of information to and from the FC-AL, and locating the status and control registers required by the FC-AL protocols. Prior art FC-AL interfaces, typically, used a PCI interface having dedicated random access memory (RAM), read only memory (ROM), and configuration programmable array logic (PAL). In the present invention, the special purpose FC-AL RAM, ROM and PAL in may be eliminated and all necessary FC-AL information (data, status and control) storage may be located in the general purpose main memory.

FC-AL is a high-speed, serial technology used for server-storage connectivity and may be used in s Storage Area Network (SAN) environment. FC-AL has received broad acceptance in the industry because of its high bandwidth and scalability, and, in addition, its ability to support multiple protocols, such as SCSI and IP, over a single physical connection. FC-AL enables the SAN infrastructure to function as both a server interconnect and as a direct interface to storage devices and storage arrays.

For illustrative purposes preferred embodiments of the present invention are described hereinafter for computer systems utilizing the Intel x86 microprocessor architecture and certain terms and references will be specific to that processor platform. AGP, PCI and Fibre Channel are interface standards, however, that are hardware independent and may be utilized with any host computer designed for these interface standards. It will be appreciated by those skilled in the art of computer systems that the present invention may be adapted and applied to any computer platform utilizing the AGP, PCI and Fibre Channel interface standards.

Figure 1:
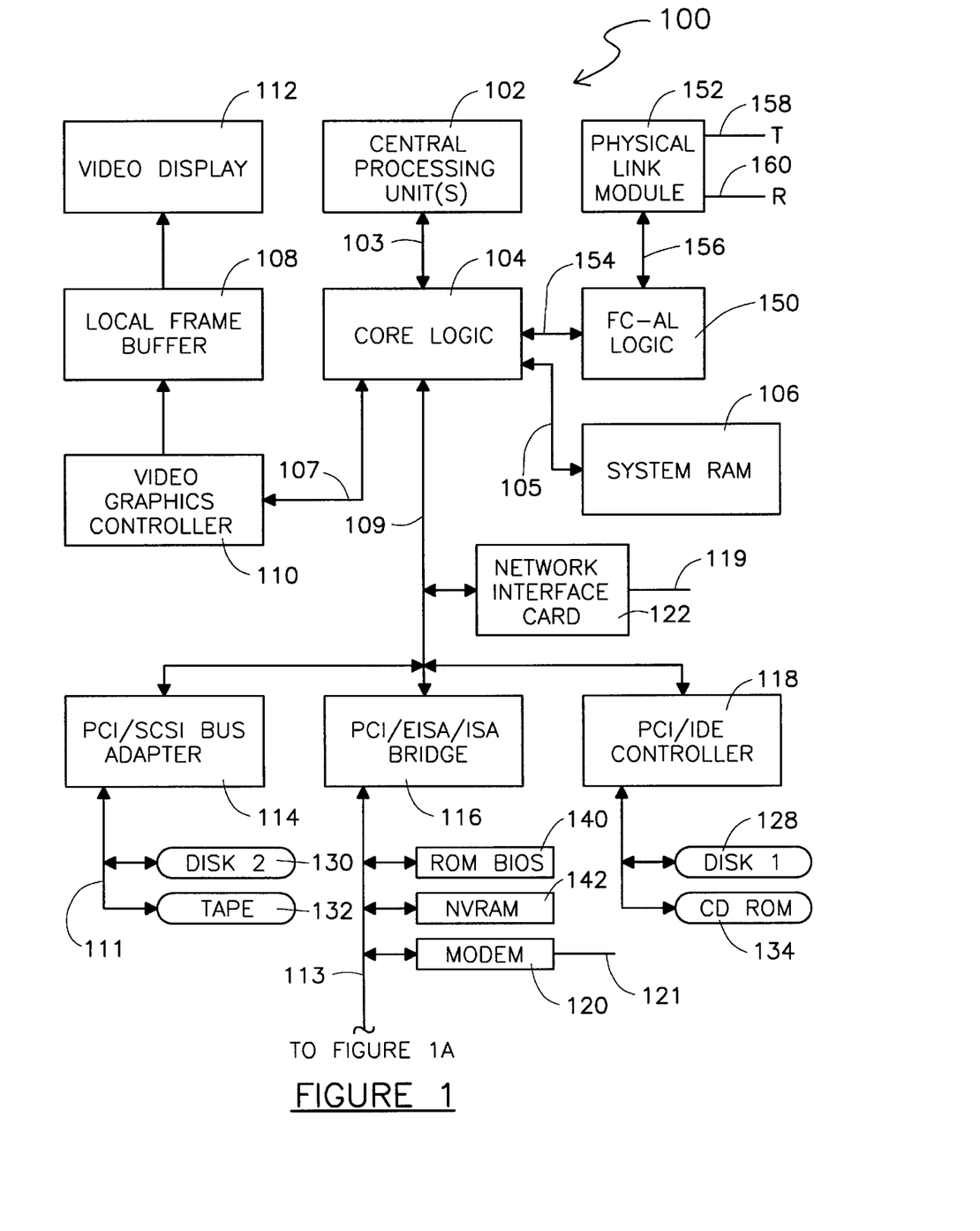
FIG. 1 and FIG. 1A are a schematic block diagram of a computer system having a primary PCI bus, an AGP bus and an FC-AL duplex connection for interfacing with an FC-AL network.
Figure 1A:
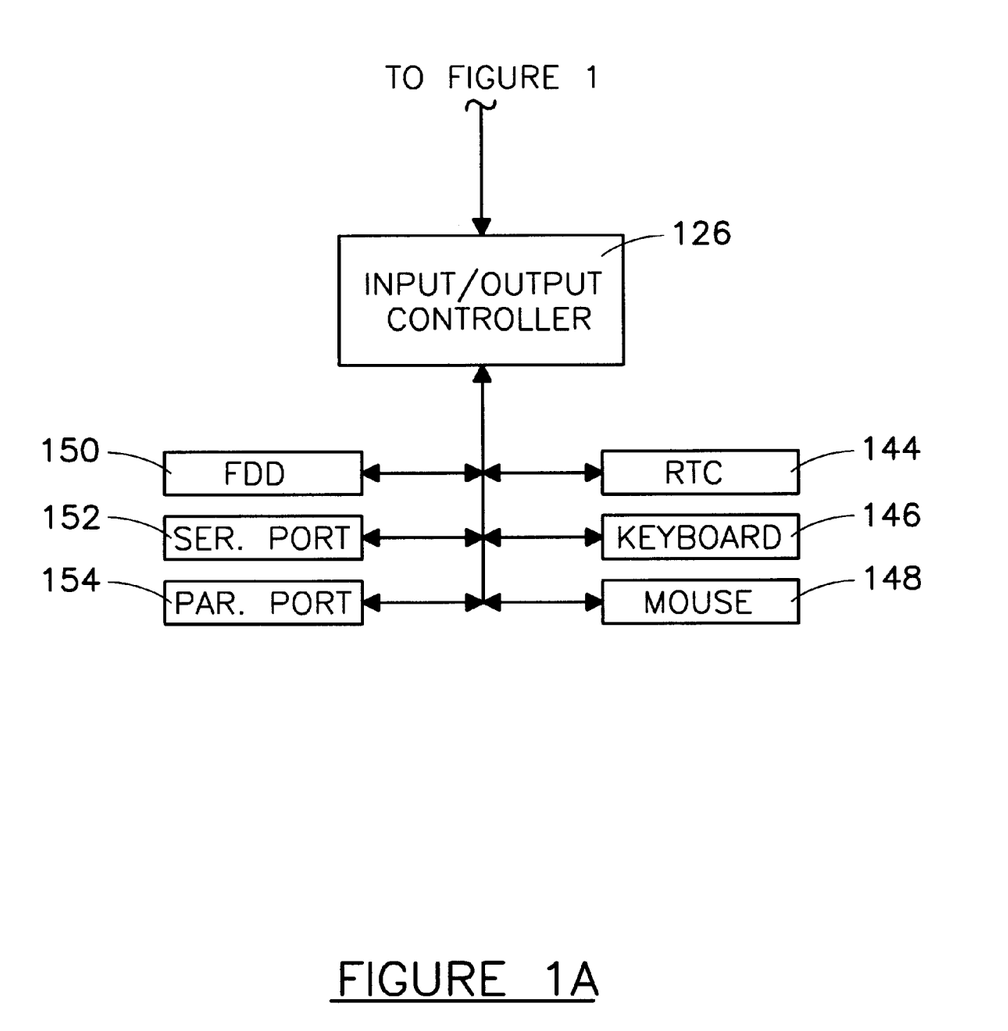

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1 and FIG. 1A, a schematic block diagram of a computer system utilizing AGP and PCI buses, and an FC-AL interface is illustrated. The computer system is generally indicated by the numeral 100 and comprises a central processing unit ("CPU") 102, core logic 104, system random access memory ("RAM") 106, a video graphics controller 110, a local frame buffer memory 108, a video display 112, FC-AL logic 150, a FC-AL physical link module 152, a PCI/SCSI bus adapter 114, a PCI/EISA/ISA bridge 116, and a PCI/IDE controller 118. Single or multi-level cache memory (not illustrated) may also be included in the computer system 100 according to the current art of microprocessor computers. The CPU 102 may be a plurality of CPUs 102 in a symmetric or asymmetric multi-processor configuration.

Figure 4:
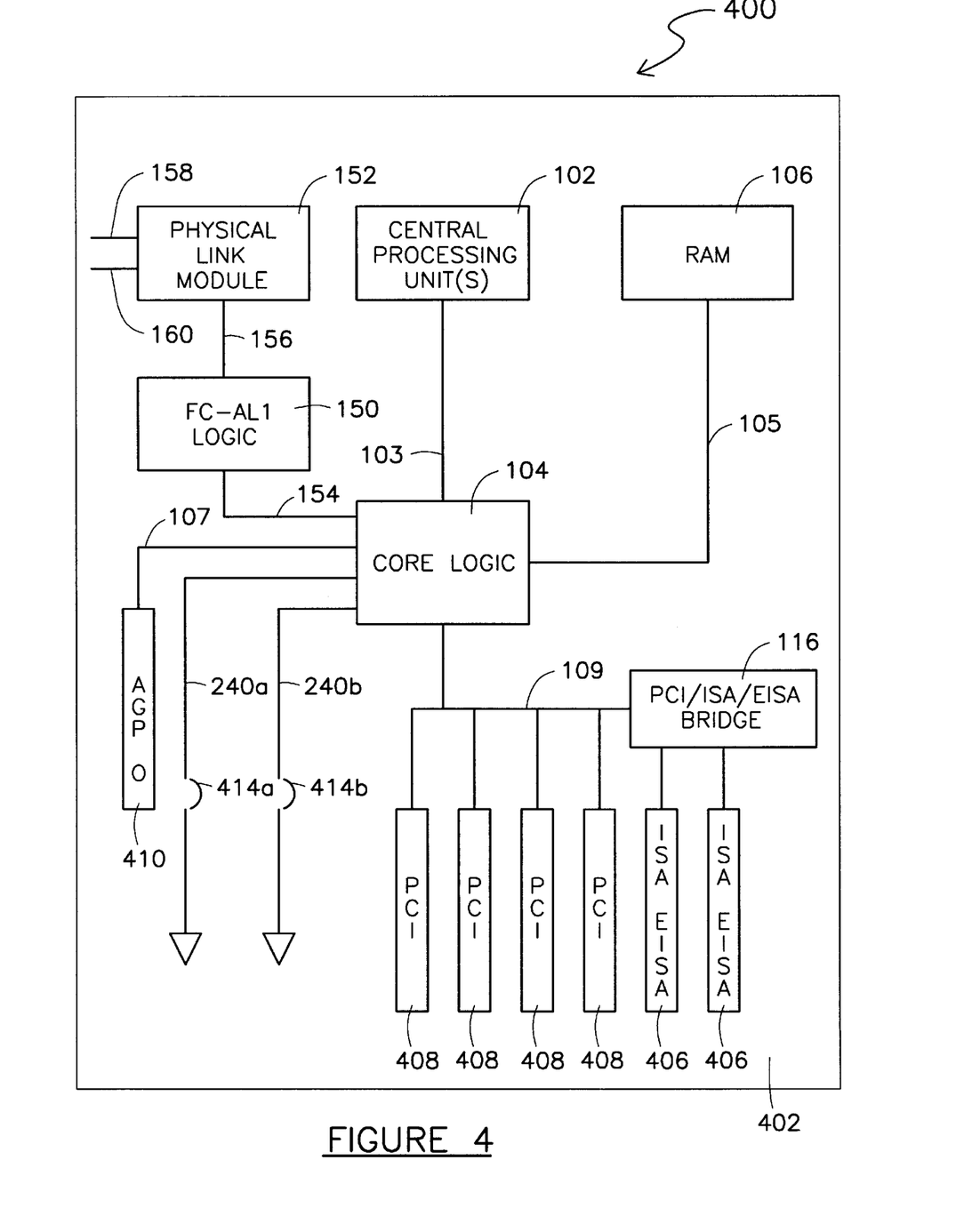
FIG. 4 is schematic plan view of a computer system motherboard, according to the present invention.

The CPU 102 is connected to the core logic 104 through a host bus 103. The system RAM 106 is connected to the core logic 104 through a memory bus 105. The local frame buffer memory 108 is connected to the video graphics controller 110 which is connected to the core logic 104 through an AGP or additional FC-AL interface (AGP/FC-AL) bus 107. The FC-AL logic 150 is connected to the core logic 104 through an FC-AL interface or additional AGP bus 154. The FC-AL logic 150 and the FC-AL physical link module 152 are connected together by an FC-Al physical link bus 156. The PCI/SCSI bus adapter 114, PCI/EISA/ISA bridge 116, and PCI/IDE controller 118 are connected to the core logic 104 through a PCI bus 109. Also connected to the PCI bus 109 is a network interface card ("NIC") 122. Some of the PCI devices such as the NIC 122 may plug into PCI connectors on the computer system 100 motherboard (FIG. 4).

Hard disk 130 and tape drive 132 may be connected to the PCU/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, serial port 152, and parallel port 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134. The FC-AL physical link module 152 connects to a duplex communications network comprising transmitting circuit 158 and receiving circuit 160. The transmitting circuit 158 and the receiving circuit 160 may be glass fiber optical cables, copper or aluminum coaxial cables, or insulated wire twisted pairs, depending on the desired transmission distances between the Fibre Channel nodes.

Figure 2:
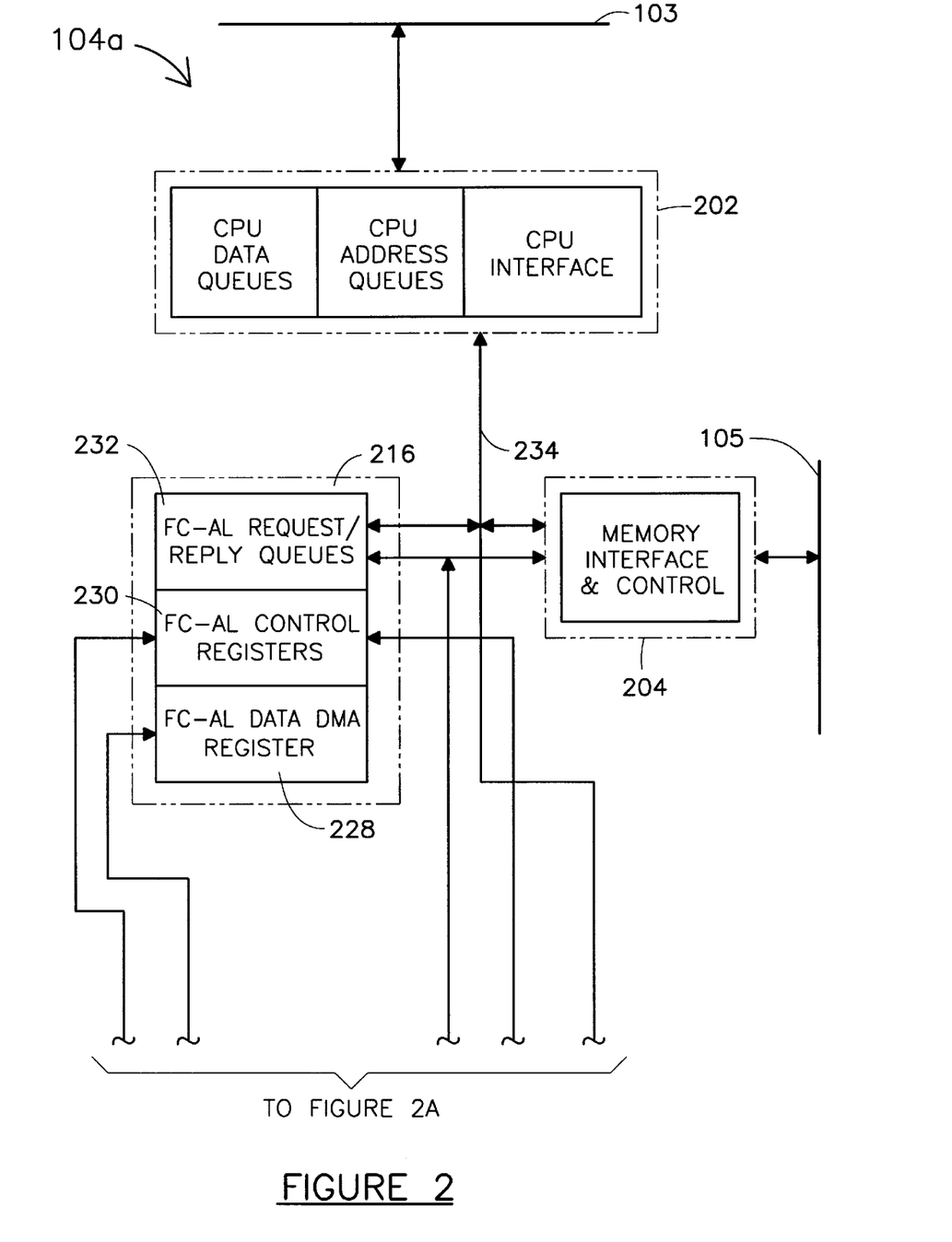
FIG. 2 and FIG. 2A are a schematic functional block diagram of an embodiment of the present invention.
Figure 2A:
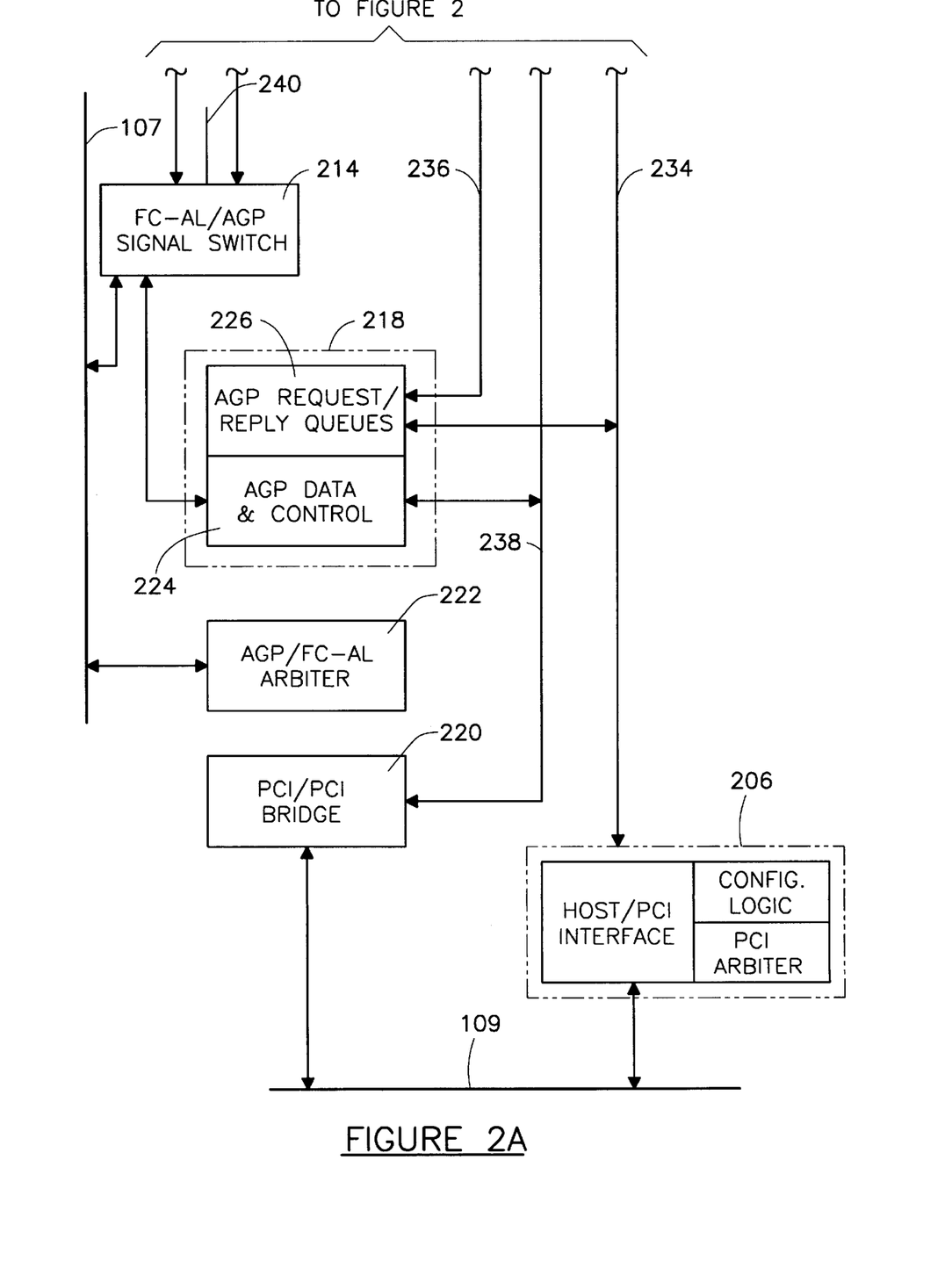

Referring now to FIG. 2 and FIG. 2A, a schematic functional block diagram of the core logic 104a, according to an embodiment of the present invention, is illustrated. The core logic 104a functionally comprises CPU host bus interface and queues 202, memory interface and control 204, host/PCI bridge 206, AGP logic 218, FC-AL logic 216, FC-AL/AGP signal switch 214, AGP/FC-AL arbiter 222, and PCI/PCI bridge 220. The AGP logic 218 comprises AGP data and control 224, and AGP request/reply queues 226. The FC-AL logic 216 comprises FC-AL data direct memory access (DMA) register 228, FC-Al control register 230, and FC-AL request/reply queues 232.

The FC-AL/AGP signal switch 214 connects either the FC-AL logic 216 or the AGP logic 218 to the AGP/FC-AL bus 107. Software control or hardware control of the FC-AL/AGP signal switch 214 is contemplated herein. For example, a hardware signal input 240 may be used to control the FC-AL/AGP signal switch 214. The FC-AL DMA register 228 may have a data word width of 64 bits, and the FC-AL control register 230 may have a data word width of 32 bits. The CPU host bus interface and queues 202 connect to the host bus 103 and include interface logic for all data, address and control signals associated with the CPU(s) 102 of the computer system 100. Multiple CPUs 102 and cache memory (not illustrated) are contemplated and within the scope of the present invention. Internal bus 234 connects the CPU host bus interface and queues 202 to the FC-AL logic 216 and the AGP logic 218. Internal bus 236 connects the memory interface and control 204 to the FC-AL logic 216 and the AGP logic 218. The PCI/PCI bridge 220 may be used during configuration or startup (POST) of the computer system 100 to configure either the FC-AL logic 216 or the AGP logic 218 through the host/PCI bridge 206 and PCI/PCI bridge 220. The PCI/PCI bridge connects to the FC-AL control registers 230 and AGP data and control over internal bus 238. FC-AL operation, according to the present invention, may store information in the RAM 106. Thus FC-AL data, status and control information may be located in the RAM 106 and used similarly to AGP operation by the AGP logic 218 which uses the RAM 106 for storage of graphics information (data, status and control) in conjunction with an AGP GART table, and main memory resident (RAM 106) status and control registers, as more fully described in commonly owned U.S. patent applications Ser. No. 08/941,862; filed Sep. 30, 1997, entitled "Accelerated Graphics Port Memory Mapped Status and Control Registers" by Ronald T. Horan, Phillip M. Jones, Gregory N. Santos, Robert Allan Lester, and Robert C. Elliott, hereby incorporated by reference.

Figure 3:
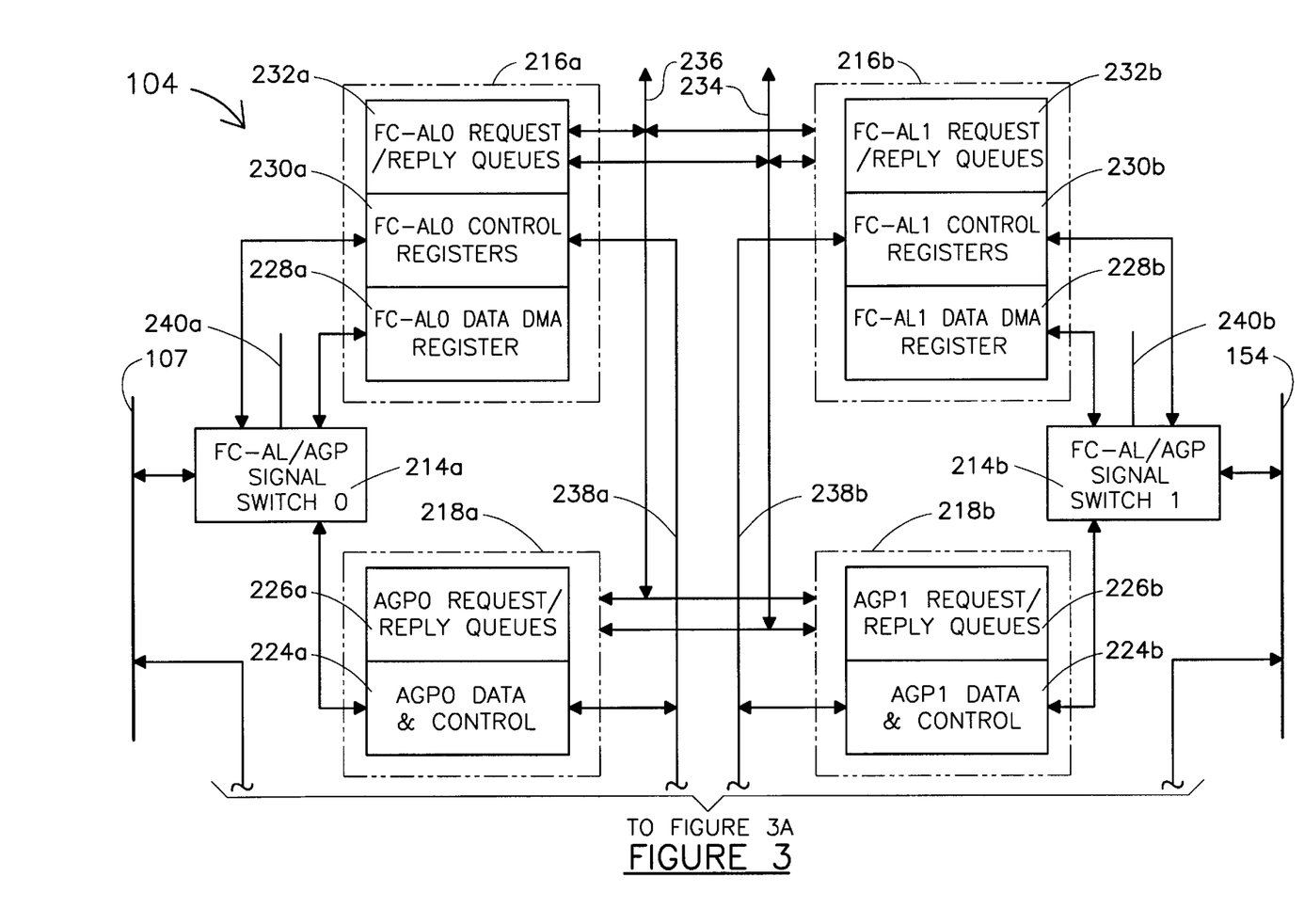
FIG. 3 and FIG. 3A are a schematic functional block diagram of an embodiment of the present invention according to the computer system of FIG. 1.
Figure 3A:
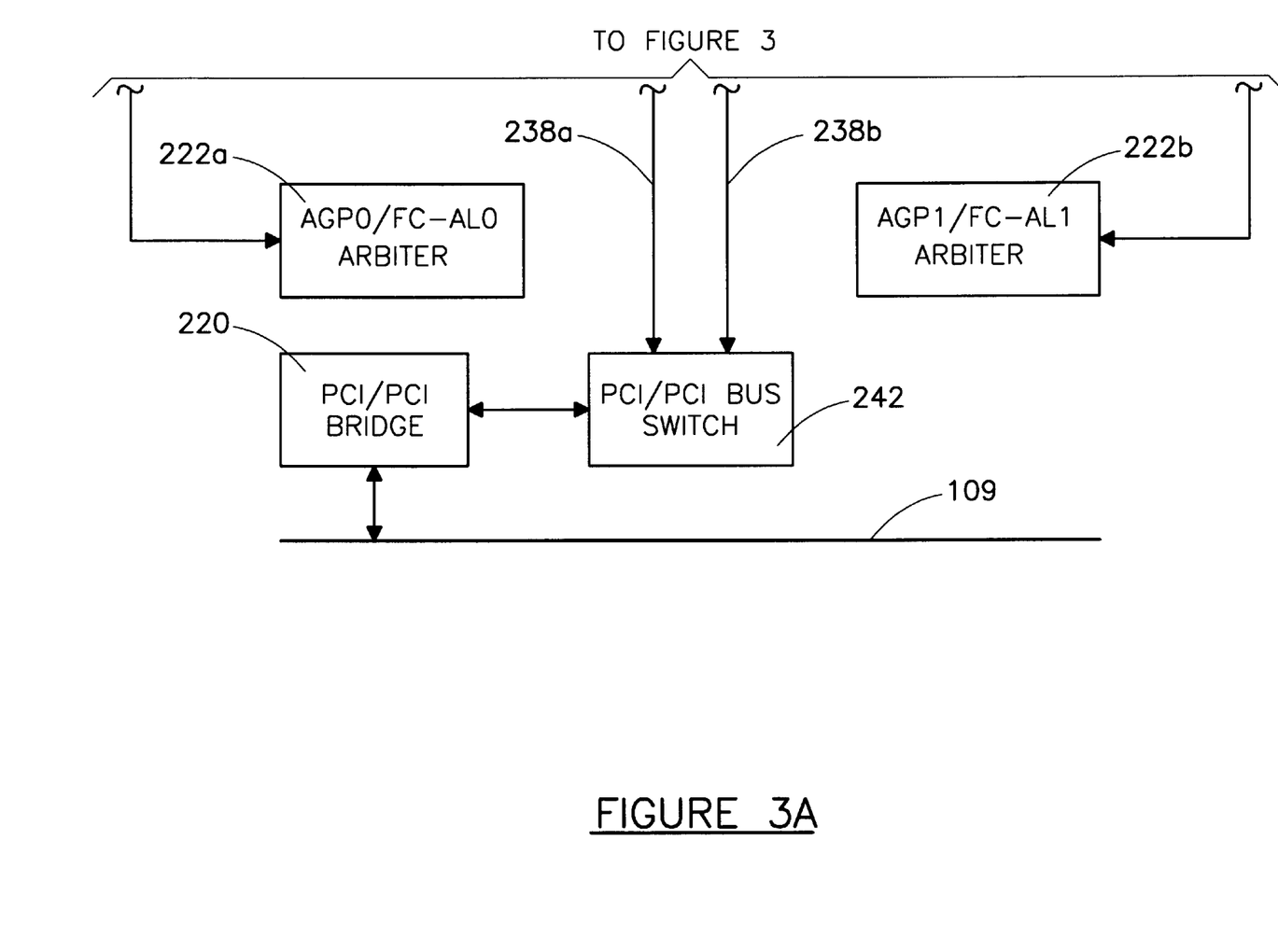

Referring now to FIG. 3 and FIG. 3A, a schematic functional block diagram of the core logic 104 of the present invention is illustrated. The core logic 104 may be configured with two AGP/FC-AL buses 107 and 154. Each of the buses 107 and 154 may be configured as an AGP or FC-AL interface as disclosed above through AGP/FC-AL signal switches 214a and 214b, respectively. Thus, the present invention may be utilized as two AGP interfaces, i.e. AGP0 and AGP1, one AGP interface and one FC-AL interface, or two FC-AL interfaces, i.e., FC-AL0 and FC-AL1. Selection of either the AGP or FC-AL interfaces may be made by hardware signal inputs 240a and 240b or by software control during startup or configuration of the computer system 100. Not illustrated in FIG. 3 and FIG. 3A for clarity but still part of this embodiment are the CPU host bus interface and queues 202, memory interface and control 204, and host/PCI bridge 206 (FIG. 2 and FIG. 2A).

Referring to FIG. 4, a schematic block diagram of a computer system motherboard is illustrated in plan view. The computer system motherboard 400 comprises a printed circuit board 402 on which components and connectors are mounted thereto. The printed circuit board 402 comprises conductive printed wiring which is used to interconnect the components and connectors thereon. The conductive printed wiring (illustrated as buses 103, 105, 107, 109 and 154) may be arranged into signal buses having controlled impedance characteristics. On the printed circuit board 402 are the core logic 104, CPU(s) 102, RAM 106, PCI/ISA/EISA bridge 116, ISA/EISA connectors 406, PCI connectors 408 (primary PCI bus 109), AGP connector 410, FC-AL logic 150, and physical link module 152. The printed circuit board 402 may also be adapted for a second AGP connector connected to bus 154, and a second FC-AL logic connected to bus 107.

The core logic 104 is configurable for different uses depending on what type of computer system it is being used in. The present invention may be operable as an AGP interface and a FC-AL interface, as two AGP interfaces, or as two FC-AL interfaces. Hardware jumpers 414a and 414b may be utilized to select the core logic 104 interface personality combinations, or configuration registers within the core logic 104 may be set by software during system configuration or POST after enumerating the various computer system buses to determine what peripheral cards have been connected to the AGP/FC-AL buses 107, 154. A feature of the present invention allows automatic configuration of the core logic 104 as an AGP interface if an AGP compliant device (not illustrated) is detected on the bus 107 and an FC-AL interface if FC-AL logic is detected on the bus 154. The PCI connectors 408 are connected to the computer system primary PCI bus 109. The PCI connectors 408 are standard PCI connectors as more fully described in the PCI 2.1 Specification, and the AGP connector 410 is a standard AGP connector as more fully described in the AGP Specification, both specifications incorporated by reference hereinabove. The FC-AL logic 150 converts parallel information on the bus 154 from/to high speed serial information on the bus 156 which is translated into light pulses or electrical pulses in the physical link module 152. Fibre Channel network connections are made to the transmitting circuit 158 and receiving circuit 160 of the physical link module 152.

Figure 5:
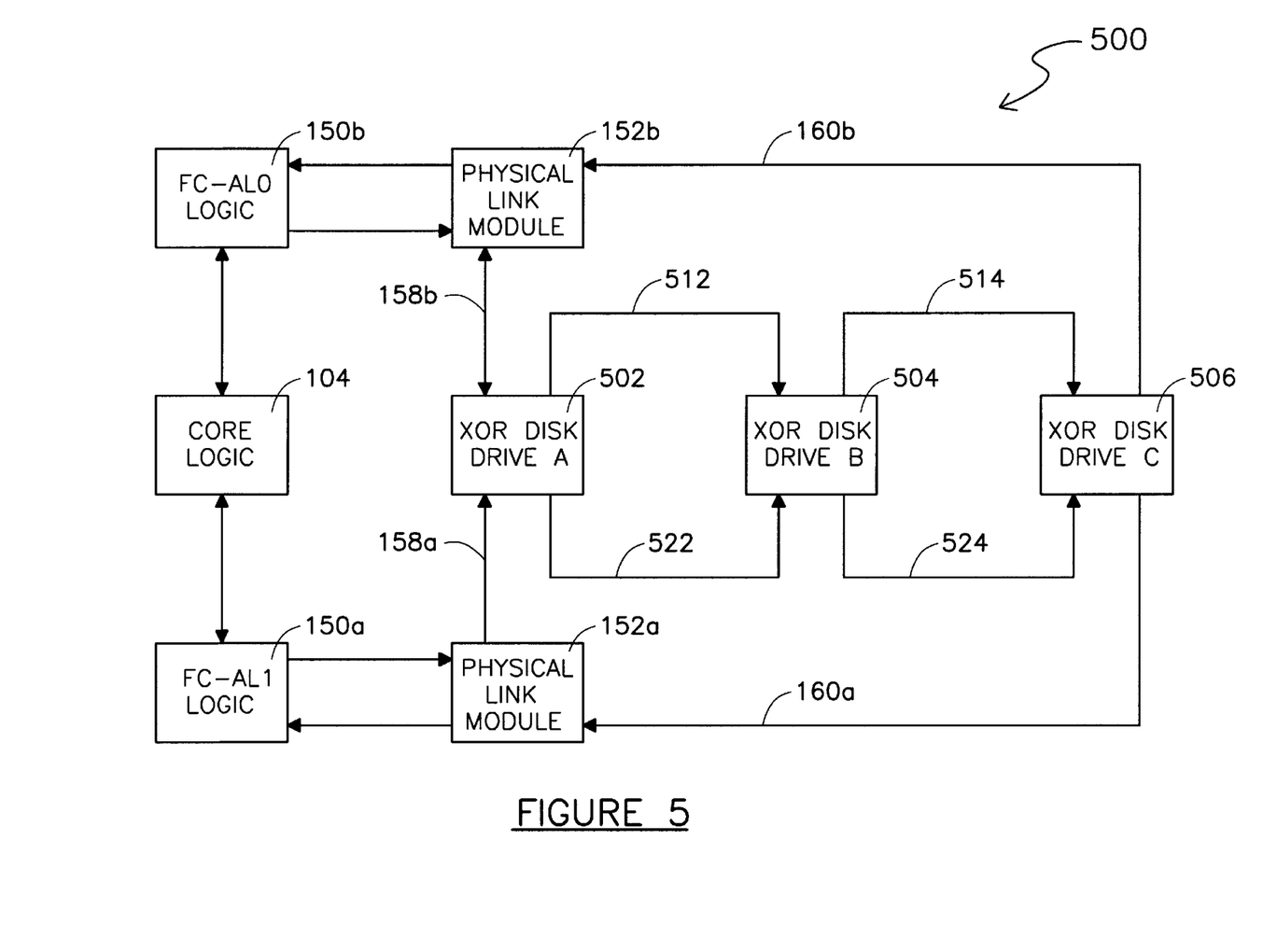
FIG. 5 is a schematic block wiring diagram of an FC-AL network.

Referring now to FIG. 5, a schematic block wiring diagram of an FC-AL network is illustrated. The computer system 100 may be configured as a server and connected to an array of storage disk drives configured as a RAID system and utilized in a storage area network (SAN) 500. The SAN 500 illustrated in FIG. 5 is a redundant Fibre Channel Arbitrated Loop system wherein dual loops are utilized in a fail safe disk storage system. The first FC-AL loop is represented by circuits 158a, 522, 524 and 160a. The second FC-AL loop is represented by circuits 158b, 512, 514 and 160b. The core logic 104 of the present invention may be configured for two FC-AL interfaces connected to FC-AL logic 150a and 150b. The FC-AL logic 150a and 150b convert the parallel data and control signals from the core logic 104 into high speed serial digital information that is sent to and received from the physical link modules 152a and 152b. The physical link modules 152a and 152b generate the appropriate signals (laser or LED light pulses, or ECL electrical pulses) for the FC-AL circuit loops. Automatic switching between the FC-AL circuit loops may be made in the electronics of the disk drives 502, 504 and 506. The disk drives 502, 504 and 506 may also have exclusive OR (XOR) logic and may thus be used as an integrated RAID 5 storage system. The FC-AL circuit loops may be fiber optical cables, copper or aluminum coaxial cables, insulated wire twisted pairs, or any combination thereof depending on the distance required between device nodes.

Figure 6:
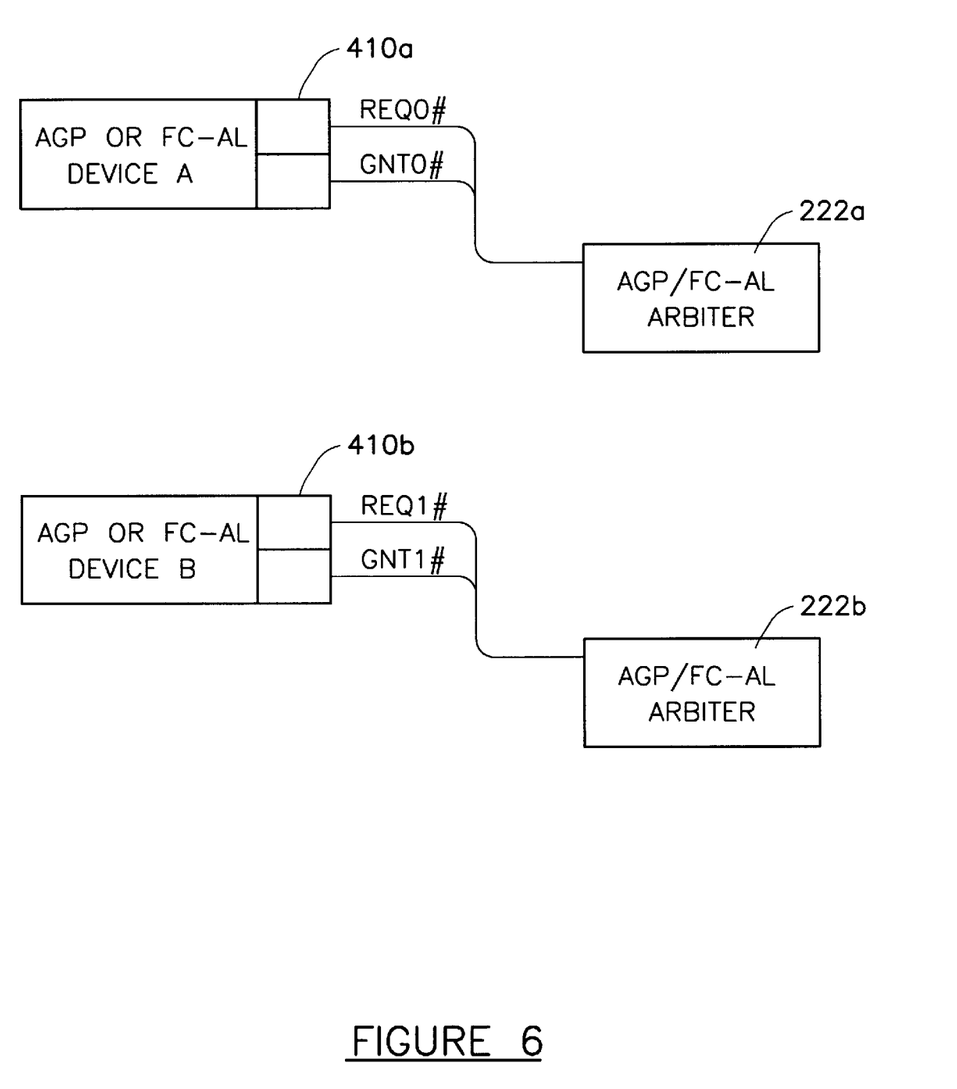
FIG. 6 is a schematic block wiring diagram of a portion of the embodiment of the present invention according to FIGS. 2, 3 and 4.

Referring now to FIG. 6, a schematic block wiring diagram of a portion of the embodiment of the present invention according to FIGS. 2, 2A, 3, 3A and 4 is illustrated. Each AGP device card inserted into an AGP connector 410 requires request (REQ#) and grant (GNT#) signals. According to the AGP Specification, an AGP device is selected and is allowed to become the AGP bus initiator when it asserts its respective REQ# signal onto the AGP bus and the AGP arbiter acknowledges the AGP device bus initiator request by asserting the respective GNT# signal back to PCI device requesting the AGP bus. In the multiple use core logic 104 of the present invention, individual request and grant signal lines are available for each of the AGP bus devices on buses 107 and 154. This is partially illustrated by AGP connector 610a connected to REQ0# and GNT0# signal lines and AGP connector 710b connected to REQ1 # and GNT1# signal lines, from the AGP/FC-AL arbiters 222a and 222b (FIG. 3 and FIG. 3A), respectively. All other PCI connectors 408 and embedded PCI devices (i.e., PCI/ISA/EISA bridge 116) each have individual REQ and GNT signal lines connected thereto and may be supplied from the PCI arbiter in the host/PCI bridge 206 of the core logic 104. The AGP/FC-AL arbiters 222a and 222b may also be used when the core logic 104 is configured as an FC-AL interface(s).

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset configurable as either an accelerated graphics port (AGP) interface or a Fibre Channel Arbitrated Loop (FC-AL) interface and connects a computer processor and memory thereto, said system comprising:

a central processing unit connected to a host bus;

a random access memory connected to a random access memory bus;

a core logic chipset connected to the host bus and the random access memory bus;

said core logic chipset comprising;

an accelerated graphics port (AGP) request queue;

an AGP reply queue;

an AGP data and control logic;

an arbiter;

an FC-AL request queue;

an FC-AL reply queue;

an FC-AL control register;

an FC-AL data direct memory access register;

a PCI to PCI bridge;

said AGP request and reply queues connected to a memory interface and control logic, said memory and interface control logic connected to said random access memory bus;

said AGP data and control logic connected to said AGP request and reply queues;

said AGP data and control logic connected to an AGP interface;

said arbiter connection to said AGP interface;

said AGP request and reply queues connected to a host bus interface, said host bus interface connected to said host bus;

a host to PCI bus bridge connected to said host bus interface and connected to a primary PCI bus;

said PCI to PCI bridge connected to said AGP interface, wherein said PCI to PCI bridge transfers PCI information transactions between said Host to primary PCI bus bridge and said AGP data and control logic;

said FC-AL request and reply queues connected to said memory interface and control logic and to said host bus interface;

said FC-AL control register connected to said FC-AL request and reply queues;

an FC-AL data direct memory access register connected to said FC-AL control register; and said arbiter, said FC-AL data direct memory access register and said FC-AL control register connected to an FC-AL interface, wherein said core logic chipset configured as an interface bridge between the host bus and said AGP interface if a first configuration signal is present, or as an interface bridge between the host bus and said FC-AL interface if a second configuration signal is present; and said core logic chipset configured as an interface bridge between the random access memory bus and said AGP interface if the first configuration signal is present, or as an interface bridge between the random access memory bus and said FC-AL interface if the second configuration signal is present.

2. The computer system of claim 1, wherein the central processing unit is a plurality of central processing units.

3. The computer system of claim 1, wherein the core logic chipset is at least one integrated circuit.

4. The computer system of claim 3, wherein the at least one integrated circuit core logic chipset is at least one application specific integrated circuit.

5. The computer system of claim 3, wherein the at least one integrated circuit core logic chipset is at least one programnmnable logic array integrated circuit.

6. The computer system of claim 3, further comprising a signal switch which connects said AGP interface, if the first configuration signal is present, or connects said FC-AL interface, if the second configuration signal is present, to external connections on the at least one integrated circuit.

7. The computer system of claim 1, further comprising an FC-AL logic circuit for transmitting and receiving high speed digital serial information, said FC-AL logic circuit connected to the FC-AL interface of the core logic chipset.

8. The computer system of claim 7, further comprising an FC-AL physical link module connected to said FC-AL logic circuit and used as a signal interface between said FC-AL logic circuit and an FC-AL network.

9. The computer system of claim 8, wherein said FC-AL physical link module comprises emitter coupled logic drivers and receivers.

10. The computer system of claim 8, wherein said FC-AL physical link module comprises laser light drivers and laser photo optic light receivers.

11. The computer system of claim 8, wherein said FC-AL physical link module comprises light emitting diode drivers and photo optic light receivers.

12. The computer system of claim 1, wherein the host bus, random access memory bus, and an AGP bus connected to said AGP interface are on a printed circuit board.

13. The computer system of claim 12, further comprising an FC-AL logic circuit and an FC-AL physical link module on said printed circuit board.

14. The computer system of claim 1, wherein the first and second configuration signals are from an electrical signal sent from a hardwired jumper circuit located on the printed circuit board.

15. The computer system of claim 1, wherein the first and second configuration signals are from software control of said core logic chipset.

16. The computer system of claim 15, wherein the first configuration signal is from detection of an AGP device on the AGP bus connected to the first AGP interface.

17. The computer system of claim 16, wherein the first or second configuration signal is determined during power on self test of the computer system.

18. The computer system of claim 16, wherein the first or second configuration signal is determined during configuration of the computer system.

19. A core logic chipset configurable for either an accelerated graphics port (AGP) interface or a Fibre Channel Arbitrated Loop (FC-AL) interface, comprising:

an accelerated graphics port (AGP) request queue;

an AGP reply queue;
an AGP data and control logic;
an arbiter;
an FC-AL request queue;
an FC-AL reply queue;
an FC-AL control register;
an FC-AL data direct memory access register;
a PCI to PCI bridge;
said AGP request and reply queues connected to a memory interface and control logic, said memory and interface control logic adapted for connection to a computer system random access memory;
said AGP data and control logic connected to said AGP request and reply queues;
said AGP data and control logic adapted for connection to an AGP interface;
said arbiter adapted for connection to the AGP interface;
said AGP request and reply queues connected to a host bus interface, said host bus interface adapted for connection to a computer system host bus having at least one central processing united connected thereto;
a host to PCI bus bridge connected to said host bus interface and adapted for connection to a computer system primary PCI bus;
said PCI to PCI bridge connected to said AGP interface, wherein said PCI to PCI bridge transfers PCI information transactions between said Host to primary PCI bus bridge and said AGP data and control logic;
said FC-AL request and reply queues connected to said memory interface and control logic and to said host bus interface;
said FC-AL control register connected to said FC-AL request and reply queues;
an FC-AL data direct memory access register connected to said FC-AL control register; and
said arbiter, said FC-AL data direct memory access register and said FC-AL control register adapted for connection to an FC-AL logic circuit.

20. The core logic chipset according to claim 19, further comprising a signal switch between the AGP interface and the FC-AL interface, and a common AGP/FC-AL bus.

21. The core logic chipset according to claim 20, wherein said signal switch is controlled by a hardware jumper applying a control signal to said core logic chipset.

22. The core logic chipset according to claim 20, wherein said signal switch is controlled by software configuring a control register in said core logic chipset.

23. A core logic chipset configurable for two accelerated graphics port (AGP) interfaces, an AGP interface and a Fibre Channel Arbitrated Loop (FC-AL) interface, or two FC-AL interfaces, comprising:

first and second accelerated graphics port (AGP) request queues;
first and second AGP reply queues;
first and second AGP data and control logic;
first and second arbiters;
first and second FC-AL request queues;
first and second FC-AL reply queues;
first and second FC-AL control registers;
first and second FC-AL data direct memory access registers;
a PCI to PCI bridge;
a PCI to PCI bus switch
said first and second AGP request and reply queues connected to a memory interface and control logic, said memory and interface control logic adapted for connection to a computer system random access memory;

said first and second AGP data and control logic connected to said first and second AGP request and reply queues, respectively;

said first and second AGP data and control logic adapted for connection to first and second AGP interfaces;

said first and second arbiters adapted for connection to the first and second AGP interfaces;

said first and second AGP request and reply queues connected to a host bus interface, said host bus interface adapted for connection to a computer system host bus having at least one central processing united connected thereto;

a host to PCI bus bridge connected to said host bus interface and adapted for connection to a computer system primary PCI bus;

said PCI to PCI bus switch is connected between said PCI to PCI bridge and said first and second AGP interfaces, wherein said PCI to PCI bridge transfers PCI information transactions between said host to primary PCI bus bridge and said first and second AGP data and control logic;

said first and second FC-AL request and reply queues connected to said memory interface and control logic and to said host bus interface;

said first and second FC-AL control register connected to said first and second FC-AL request and reply queues, respectively;

first and second FC-AL data direct memory access registers connected to said first and second FC-AL control registers, respectively; and said first and second arbiters, said first and second FC-AL data direct memory access registers and said first and second FC-AL control registers adapted for connection to first and second FC-AL logic circuits.

24. A computer system having a core logic chipset configurable for two accelerated graphics port (AGP) interfaces, an AGP interface and a Fibre Channel Arbitrated Loop (FC-AL) interface, or two FC-AL interfaces, and connects a computer processor and memory thereto, said system comprising:

at least one central processing unit connected to a host bus;

a random access memory connected to a random access memory bus;

a core logic chipset connected to the host bus and the random access memory bus;

said core logic chipset comprising;

first and second accelerated graphics port (AGP) request queues;

first and second AGP reply queues;

first and second AGP data and control logic;

first and second arbiters;

first and second FC-AL request queues;

first and second FC-AL reply queues;

first and second FC-AL control registers;

first and second FC-AL data direct memory access registers;

a PCI to PCI bridge;

a PCI to PCI bus switch said first and second AGP request and reply queues connected to a memory interface and control logic, said memory and interface control logic connected to said random access memory;

said first and second AGP data and control logic connected to said first and second AGP request and reply queues, respectively;

said first and second AGP data and control logic connected to first and second AGP interfaces, respectively;

said first and second arbiters connected to said first and second AGP interfaces, respectively;

said first and second AGP request and reply queues connected to a host bus interface, said host bus interface connected to said host bus;

a host to PCI bus bridge connected to said host bus interface and connected to a primary PCI bus;

said PCI to PCI bus switch is connected between said PCI to PCI bridge and said first and second AGP interfaces, wherein said PCI to PCI bridge transfers PCI information transactions between said host to primary PCI bus bridge and said first and second AGP data and control logic;

said first and second FC-AL request and reply queues connected to said memory interface and control logic and to said host bus interface;

said first and second FC-AL control register connected to said first and second FC-AL request and reply queues, respectively;

first and second FC-AL data direct memory access registers connected to said first and second FC-AL control registers, respectively; and said first and second arbiters, said first and second FC-AL data direct memory access registers and said first and second FC-AL control registers connected to first and second FC-AL interfaces, respectively; wherein, said core logic chipset configured as an interface bridge between the host bus and said first AGP interface if a first configuration signal is present, or as an interface bridge between the host bus and said first FC-AL interface if a second configuration signal is present;

said core logic chipset configured as an interface bridge between the host bus and said second AGP interface if a third configuration signal is present, or as an interface bridge between the host bus and said second FC-AL interface if a fourth configuration signal is present;

said core logic chipset configured as an interface bridge between the random access memory bus and said first AGP interface if the first configuration signal is present, or as an interface bridge between the random access memory bus and said first FC-AL interface if the second configuration signal is present; and said core logic chipset configured as an interface bridge between the random access memory bus and said second AGP interface if the third configuration signal is present, or as an interface bridge between the random access memory bus and said second FC-AL interface if the fourth configuration signal is present.

25. The computer system of claim 24, wherein the core logic chipset is at least one integrated circuit.

26. The computer system of claim 25, further comprising a first signal switch which connects said first AGP interface, if the first configuration signal is present, or connects said first FC-AL interface, if the second configuration signal is present, to external connections on the at least one integrated circuit.

27. The computer system of claim 25, further comprising a second signal switch which connects said second AGP interface, if the third configuration signal is present, or connects said second FC-AL interface, if the fourth configuration signal is present, to external connections on the at least one integrated circuit.

* * * * *